(12) United States Patent
Nierwinski, Jr.

(10) Patent No.: US 8,335,660 B2
(45) Date of Patent: Dec. 18, 2012

(54) METHOD AND SYSTEM OF CONFIDENCE INTERVAL METHODOLOGY FOR RATIO MEANS

(75) Inventor: John Stanley Nierwinski, Jr., Havre De Grace, MD (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 684 days.

(21) Appl. No.: 12/550,981

(22) Filed: Aug. 31, 2009

(65) Prior Publication Data

US 2011/0054839 A1    Mar. 3, 2011

(51) Int. Cl.
*G06F 17/18* (2006.01)
(52) U.S. Cl. ....................................................... 702/179
(58) Field of Classification Search .................. 702/147, 702/179, 181, 194, 198, 199; 705/7.24, 35, 705/36 R
See application file for complete search history.

(56) References Cited

U.S. PATENT DOCUMENTS

2005/0096950 A1* 5/2005 Caplan et al. ..................... 705/7
2008/0281742 A1* 11/2008 Lyons et al. ..................... 705/35
2009/0307149 A1* 12/2009 Markov et al. ............. 705/36 R

OTHER PUBLICATIONS

Bradley Efron, "An Introduction to the Bootstrap" 1993, Chaman & Hall/CRC, Chapter 5, chapter 12.*
Efron, B. and Tibshirani, R.J., "An Introduction to the Bootstrap", London U.K.: Chapman & Hall/CRC, 1998, Chapter 5, pp. 39-43, Chapter 12, pp. 153-166.
DiCiccio, T. and Efron, B., "Bootstrap Confidence Intervals", Statistical Science, vol. 11, No. 3, 1996, pp. 189, 199 and 200.
Cochran, W.G., "Sampling Techniques (Third edition)", John Wiley & Sons, New York, 1977, pp. 1-7.
Ross, S.M., "Introduction to Probability Models", New York: Academic Press, 2003, pp. 639-640.
Law, A.M. and Kelton, W.D., "Simulation Modeling and Analysis (Third edition)", McGraw Hill, Boston, 2000, pp. 1-7.
DiCiccio, T. and Efron, B., "Bootstrap Confidence Intervals", Statistical Science, vol. 11, No. 3, 1996, pp. 189-228.

* cited by examiner

*Primary Examiner* — Mohamed Charioui
(74) *Attorney, Agent, or Firm* — Lawrence E. Anderson

(57) ABSTRACT

A method and system for determining whether the number of samples taken from a population of units where the distribution of X and Y variables are unknown by evaluating ratio mean measurements on a computer to determine a confidence interval. The method comprising: inputting samples from the total population with each unit sample having at least two variables X and Y; redefining the multivariate data that comprises the two variables X and Y; estimating the mean; computing the standard error; using a bootstrapping method, generating boot strap samples, computing a Z distribution based upon the bootstrap samples; and computing the confidence interval. The system comprises a processor for performing the steps of the method.

15 Claims, 5 Drawing Sheets

| X | Y |
|---|---|
| $x_1$ | $y_1$ |
| . | . |
| . | . |
| $x_n$ | $y_n$ |
| $\sum_{j=1}^{n} x_j$ | $\sum_{j=1}^{n} y_j$ |

$$\frac{\sum_{j=1}^{n} x_j}{n} \bigg/ \frac{\sum_{j=1}^{n} y_j}{n} = \sum_{j=1}^{n} x_j \bigg/ \sum_{j=1}^{n} y_j$$

10

FIGURE 1 RATIO MEAN

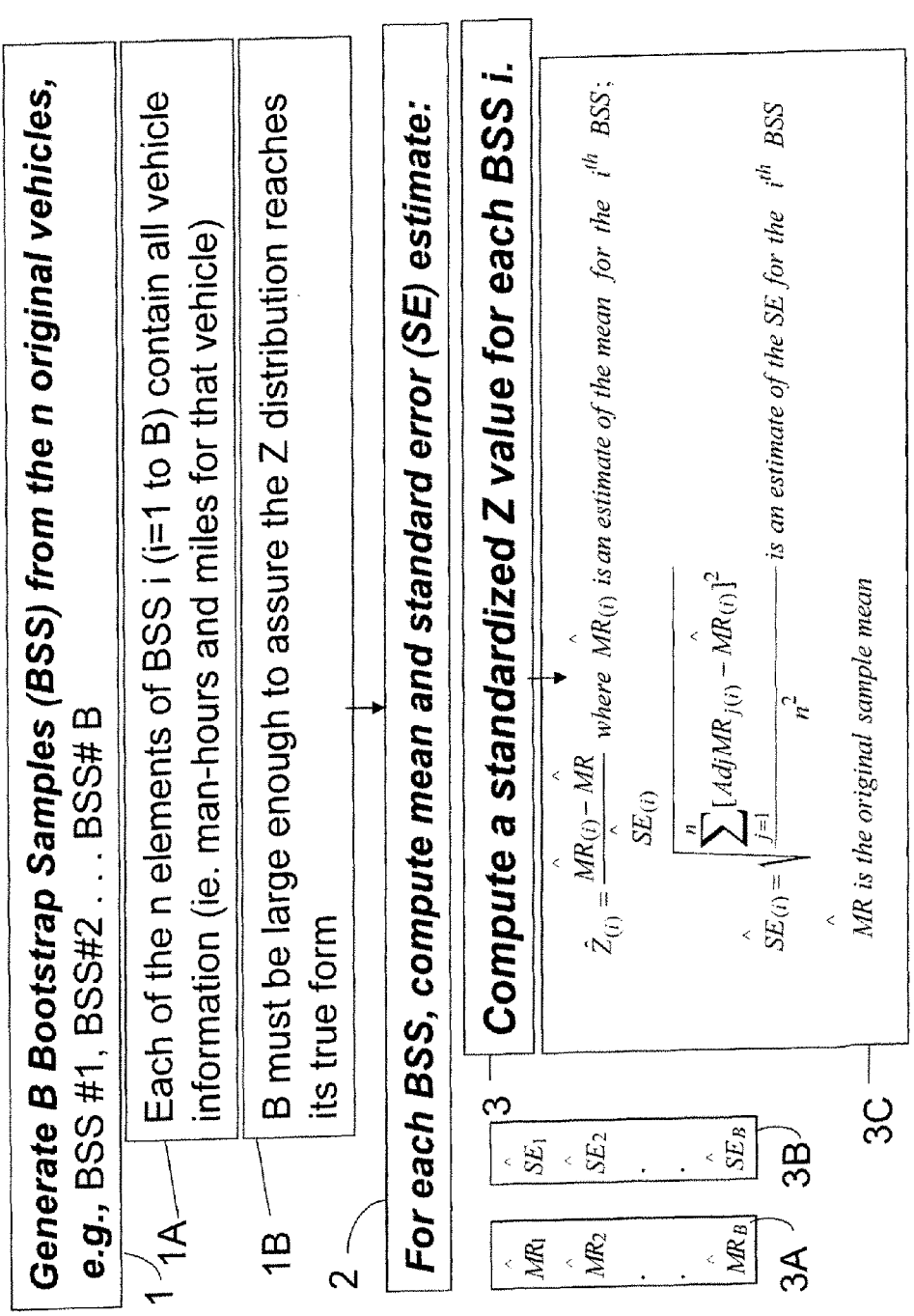
FIGURE 2 FLOW CHART SUBROUTINE

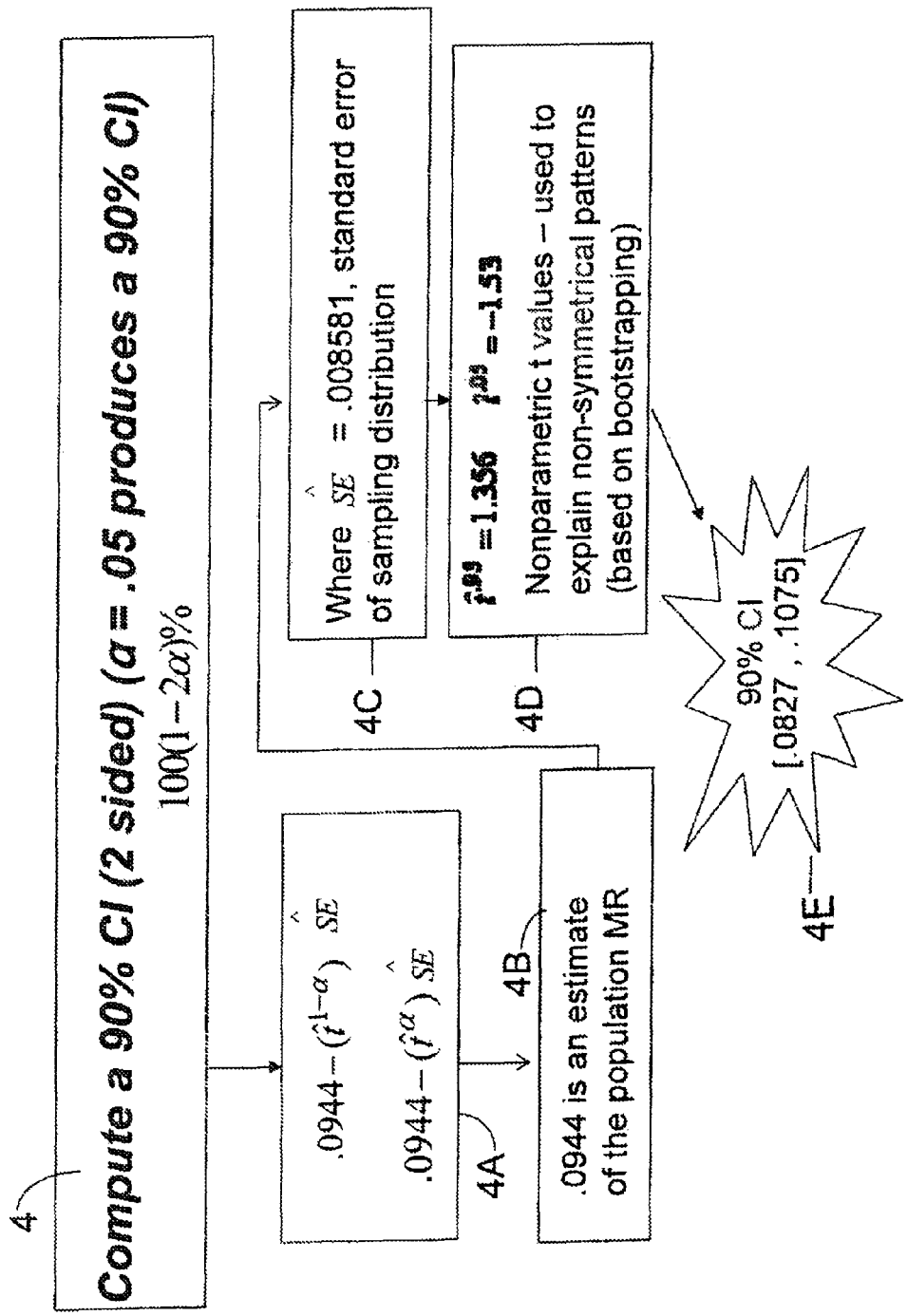

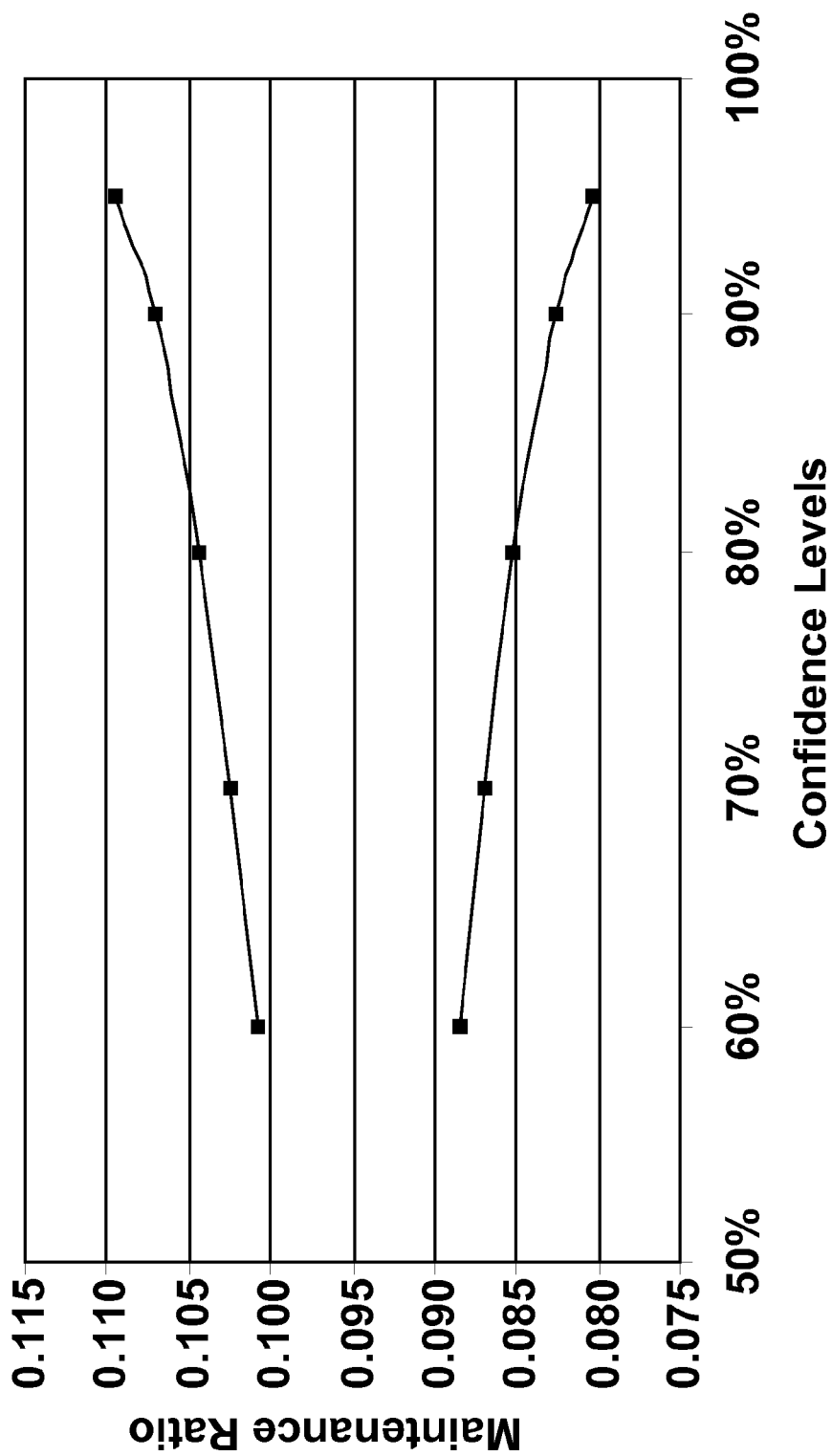

METHOD AND SYSTEM OF CONFIDENCE INTERVAL METHODOLOGY FOR RATIO MEANS

GOVERNMENT INTEREST

The invention described herein may be manufactured, used, and/or licensed by or for the United States Government.

REFERENCE TO COMPUTER PROGRAM LISTING APPENDIX

A computer program listing appendix has been electronically submitted and is hereby incorporated by reference pursuant to 37 C.F.R. 1.96(c).

FIELD OF THE INVENTION

This invention relates generally to statistical inference, and more particularly to ratio mean measurement.

BACKGROUND OF THE INVENTION

An approach to statistical inference uses bootstrapping to solve problems where the variance is in closed analytic form. Bootstrapping is implemented by creating a number of resamples of the observed sample data set equal in size; obtained by random sampling with replacement from the original dataset.

The military and many other government and private organizations have the need to evaluate ratio mean measurements to help them make informed life cycle management decisions. FIG. 1 is an illustration of a sample ratio mean. A ratio mean is the ratio of the means of two random variables, X and Y, whose corresponding terms are paired. The pairs are assumed to be independent. In FIG. 1, the correlation between X & Y may be positive, negative or zero. The X & Y in FIG. 1 are considered independent and identically distributed (i.i.d.), with some unknown distribution.

For example, the Army tracks and evaluates the performance of many weapon systems using ratio mean metrics, such as the maintenance ratio (MR). A MR estimate $$\hat{MR} = \left( \frac{\sum_{j=1}^{n} \text{man-hours}_j}{\sum_{j=1}^{n} \text{miles}_j} \right)$$

is based on a random sample (without replacement) of n vehicles from a finite population, where the pair (man-hours and miles) are associated with each vehicle.

Since it is inefficient to track every vehicle in an inventory of vehicles, ratio mean performance metrics are tracked for a sample of vehicles over a given time period. The entire population performance is inferred based on a sample of vehicles using approximate confidence intervals (CI) for ratio means. There is need to develop an efficient methodology that provides for the effective use of confidence intervals. Generally speaking, the documented standard error (SE) estimate for a ratio mean (accounts for variation in both variables and correlation) is not dependable for samples under 30 or larger samples with increased variation in both variables. Therefore, another approach is needed.

SUMMARY OF THE INVENTION

A preferred embodiment of the present invention is directed to confidence interval methodology for ratio means, in which a pre-existing nonparametric bootstrap-t framework is combined with innovative inputted data determinations to compute approximate confidence intervals for a ratio mean metric. The inputted data is "redefined" in the sense that each element of the ratio sample, i.e. each paired term, is redefined using the equation $$adjRM_k = n * X_k \bigg/ \sum_{j=1}^{n} Y_j$$

where k is the kth unit of a sample of n paired units where the pair is Xj, Yj and j is an index that represents the sample size.

The ratio mean of interest is evaluated for a given problem by computing the confidence interval (CI) of that ratio mean using the methodology of the present invention. The confidence interval methodology for ratio means produced in accordance with the principles of the present invention produces realistic approximate confidence intervals (CI's) around a ratio mean. The nonparametric bootstrap-t approach (NBTA) utilizes three parameters. The three parameters are mean, standard error (SE), and bootstrap standardized Z distribution. In a preferred embodiment confidence interval methodology for ratio means is used to compute approximate confidence intervals for a ratio mean metric.

A preferred embodiment method determines whether the number of samples taken from a population of units is substantially indicative of the total population by evaluating ratio mean measurements on a computer to determine a confidence interval. The method comprises the steps of estimating the parameters needed to construct a satisfactory confidence interval that adheres to standard confidence interval properties. The first step comprises redefining the sample. Next, the mean and standard error estimates are determined and the variance stabilized bootstrap standardized Z distribution is constructed using a large number of bootstrap samples (BSS) with n vehicles (or units of any other subject) in each sample. The equation is $\hat{z}=(MR(i)-MR)/SE(i)$ where MR(i) is an estimate of the mean for the $i^{th}$ boot strapped sample; where i is greater than 0 and less than B (preferably in the range of 1000 to 10000); SE(i) is the standard error for the $i^{th}$ boot strapped sample determined by the equation and wherein standardized distribution and standard error are determined by the equations $$\hat{Z}_{(i)} = \frac{\hat{MR}_{(i)} - \hat{MR}}{\hat{SE}_{(i)}} \text{ where } \hat{MR}_{(i)}$$

is an estimate of the mean for the $i^{th}$ BSS;

$$\hat{SE}_{(i)} = \sqrt{\frac{\sum_{j=1}^{n}\left[AdjMR_{j(i)} - \hat{MR}_{(i)}\right]^2}{n^2}} \text{ is an}$$

estimate of the SE for the $i^{th}$ BSS $\hat{MR}$ is the original sample mean where n is the sample size, which preferably is in the range of 10 to 200. The number of bootstrap samples is dependent upon the relative error desired; i.e., B must be large enough to ensure that the Z distribution is adequately representative. Next, the standardized values are ordered, followed by computation of the $\alpha^{th}$ and the $(1-\alpha)^{th}$ percentile of the Z distribution by selecting the value that falls below $\alpha\%$ and the (1−α)% of the data. The value for α typically ranges from 0.5% to 10%. For example, if α is 5% the confidence interval is defined as 90%. It follows that, the 100(1−2α)% confidence interval (CI) can be determined using these estimates:

Lower CI bound=$\hat{MR}-\hat{SE}*\hat{t}_{1-\alpha}$

Upper CI bound=$\hat{MR}-\hat{SE}*\hat{t}_{\alpha}$.

BRIEF DESCRIPTION OF THE DRAWINGS

The present invention can best be understood when reading the following specification with reference to the accompanying drawings, which are incorporated in and form a part of the specification, illustrate alternate embodiments of the present invention, and together with the description, serve to explain the principles of the invention. In the drawings:

FIG. 1 is a mathematical depiction of the ratio mean 10.

FIG. 2 is an illustration depicting a flow chart for the steps of generating B Bootstrap Samples (BSS) from the n original vehicles and computing the mean, standard error and standardized Z value for each bootstrap sample BSS.

FIG. 3 is an illustration depicting a continuation of the flow chart of FIG. 2 showing an example of the step (4) of computing a 90% confidence interval.

FIG. 4 is a graphical illustration showing examples of confidence levels on the x-axis versus the maintenance ratio on the y-axis. As the confidence level increases, the distance between the lines increases.

Figure 5:
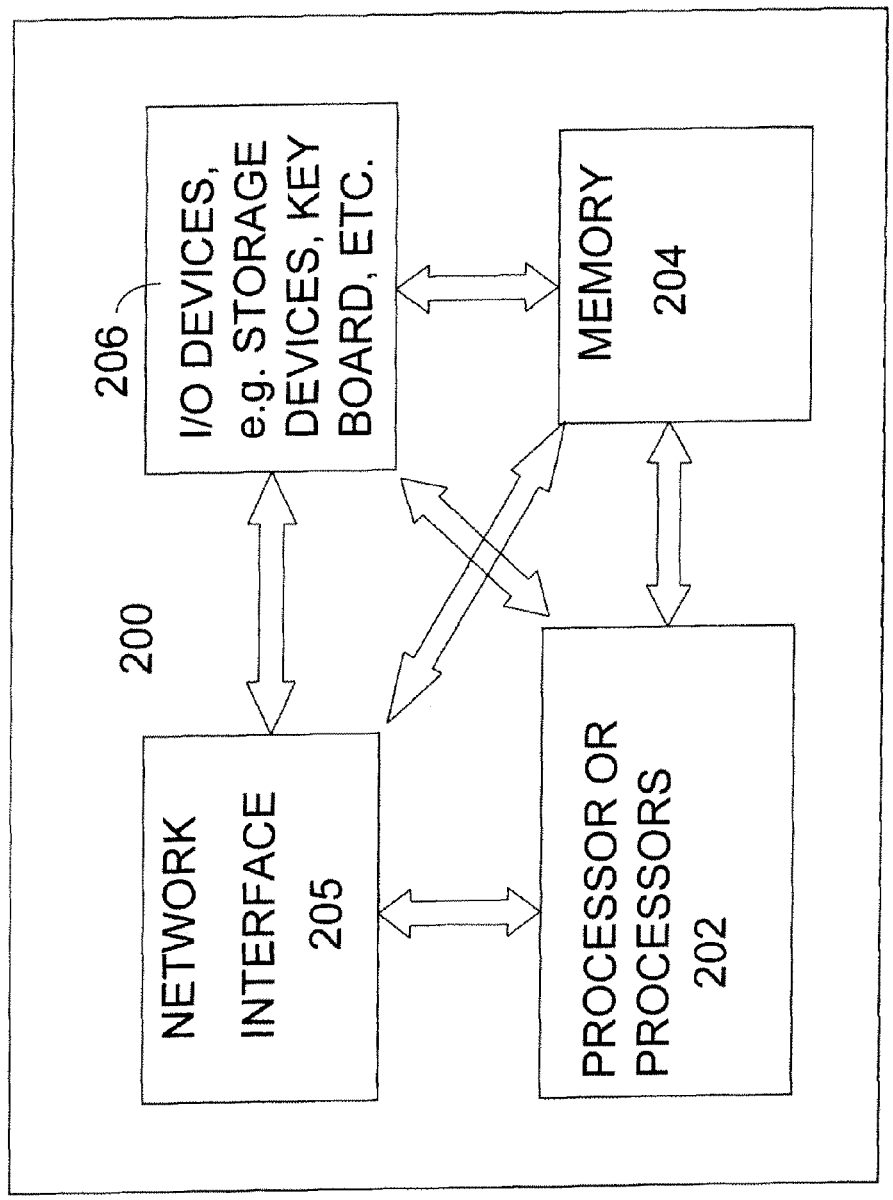
FIG. 5 depicts a high level block diagram of a general purpose computer.

A more complete appreciation of the invention will be readily obtained by reference to the following Description of the Preferred Embodiments and the accompanying drawings in which like numerals in different figures represent the same structures or elements. The representations in each of the figures are diagrammatic and no attempt is made to indicate actual scales or precise ratios. Proportional relationships are shown as approximates.

DETAILED DESCRIPTION OF THE PREFERRED EMBODIMENTS

The present invention now will be described more fully hereinafter with reference to the accompanying drawings, in which embodiments of the invention are shown. However, this invention should not be construed as limited to the embodiments set forth herein. Rather, these embodiments are provided so that this disclosure will be thorough and complete, and will fully convey the scope of the invention to those skilled in the art. In the drawings, the thickness of layers and regions may be exaggerated for clarity. Like numbers refer to like elements throughout. As used herein the term "and/or" includes any and all combinations of one or more of the associated listed items.

The terminology used herein is for the purpose of describing particular embodiments only and is not intended to limit the full scope of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

A preferred embodiment of the present invention comprises apparatus and methodology directed to confidence interval methodology for ratio means, in which a pre-existing nonparametric bootstrap-t approach is utilized to compute approximate confidence intervals for a ratio mean metric.

For example, the standard error (SE) estimate for a ratio mean as reported by Cochran, W. G., "Sampling Techniques (Third edition)", John Wiley & Sons, New York, (1977), hereby incorporated by reference, is:

$$\hat{SE} \approx \frac{\left(sqrt\left\{\frac{(1-f)}{n*\text{man}-\text{hours}}[s_{miles}^2 + \hat{MR}^2 * s_{man-hours}^2 - 2*\hat{MR}*\text{covariance (man}-\text{hours, miles)}]\right\}\right)}{(\sqrt{n})} \quad (1)$$

where n is the sample size and f is the sampling fraction (n/N), $s_{miles}^2$ & $s_{man-hours}^2$ are the sample variances of miles and man-hours, respectively.

This standard error (SE) estimate in equation (1) is only dependable for samples greater than 30 where the coefficient of variation for both variables are less than 10% as reported by Cochran in the publication referenced above. Therefore, another approach is needed to estimate the NBTA parameters for smaller samples and larger samples with high variation. The present invention is intended to overcome the deficiencies of the prior art in this regard.

In accordance with the principles of the present invention, with respect to the Mean and SE estimates for ratio mean, assuming a random sample (without replacement) of n vehicles (man-hours and miles for each vehicle) from the population of N vehicles, the sample ratio mean may be redefined to be a sample arithmetic mean, as depicted in the following Table I.

TABLE 1

Redefined Maintenance Ratio

| Vehicle # | Man-hours | Miles | Adj MR |
|---|---|---|---|
| 1 | Man-hours$_1$ | Miles$_1$ | Adj MR$_1$ |
| . | . | . | |
| k | Man-hours$_k$ | Miles$_k$ | adj MR$_k$ = n * Man-hours$_k$ / $\sum_{j=1}^{n}$ Miles$_j$ |
| . | . | . | . |
| . | . | . | . |
| n | Man-hours$_n$ | Miles$_n$ | Adj MR$_n$ |

$$\text{Sample Ratio Mean} = \frac{\sum_{j=1}^{n} \text{Man-hours}_j}{\sum_{j=1}^{n} \text{Miles}_j} = \text{Sample Arithmetic Mean}$$

As shown in Table I, the sample ratio mean and the sample arithmetic mean are each defined as the summation of man-hours divided by the summation of miles. The redefined variable AdjMR accounts for variation in man-hours but does not account for variation in miles. Correlation is also not accounted for because the pairing for man-hours and miles for each vehicle has been substantially eliminated.

The mean and SE estimates using the sample of n vehicles for $\overline{\text{AdjMR}}$ are the following [1]:

$$\hat{MR} = \frac{\sum_{j=1}^{n} \text{Man} - \text{hours}_j / n}{\sum_{j=1}^{n} \text{Miles}_j / n} \quad (2)$$

$$\hat{SE} = \sqrt{\frac{\sum_{j=1}^{n}(AdjMR_j - \hat{MR})^2}{n^2}} \quad (3)$$

where $\hat{MR}$ is the mean estimate for maintenance ratio $\overline{MR}$ where $\overline{MR}$ is the mean of man-hours divided by the mean of miles based on the population. In accordance with a preferred embodiment of the present invention, $\hat{SE}$ serves as the standard error (SE) estimate for $\overline{MR}$, even though it is not the best estimate for $\overline{MR}$ because it doesn't fully account for variation in miles. Nonetheless, these estimates, along with the standardized $\hat{Z}$ estimate, produce excellent coverages, non-coverages and efficiency results for many ratio mean problems.

A preferred embodiment of the present invention utilizes a standardized Z estimate for ratio mean and the confidence interval (CI). The redefined data (based on a random sample) can be used as input for the NBTA (nonparametric bootstrap-t approach) can be used to obtain an estimate for the standardized Z distribution. See, Efron, B. and Tibshirani, R. J., "An Introduction to the Bootstrap", London U.K.: Chapman & Hall/CRC (1998), hereby incorporated by reference.

Bootstrapping, as used herein, refers to a modern, computer-intensive general purpose approach to statistical inference, falling within a broader class of re-sampling methods. A bootstrap sample (BSS) of n vehicles is a random sample one vehicle at a time with replacement from the original sample of n vehicles. The probability of selecting a given vehicle for each of the n random selections is 1/n.

Bootstrapping (based on a sample) has been used to obtain an estimate for the standardized Z distribution as reported by Efron, B. et al., "An Introduction to the Bootstrap", London U.K.: Chapman & Hall/CRC (1998), hereby incorporated by reference. It is interesting to note that if the sample came from a normal distribution then the Z distribution approaches a standard t distribution. The power of bootstrapping enables the accounting for non-normal data. Bootstrapping in conjunction with a preferred embodiment of the present invention is used to generate an approximate confidence interval (CI) around a ratio mean. This is done by generating a large number of BSS's through a Monte Carlo simulation procedure, as set forth in Ross, S. M., "Introduction to Probability Models", New York: Academic Press, 2003, hereby incorporated by reference.

A standardized $\hat{Z}$ distribution may be estimated by bootstrapping from the sample of n vehicles. In a preferred embodiment, B bootstrap samples (BSS's) are generated of size n from the sample of n vehicles. Each of the n elements of BSS i (i=1 to B) will contain all vehicle information (i.e., man-hours, miles). For each BSS the mean and SE estimate are computed the same way that was done for the original raw sample.

A standardized $\hat{Z}$ value for each BSS is computed using the following equation.

$$\hat{Z}_{(i)} = \frac{\hat{MR}_{(i)} - \hat{MR}}{\hat{SE}_{(i)}} \quad \text{where } \hat{MR}_{(i)} \text{ is} \quad (4)$$

an estimate of the mean for the $i^{th}$ BSS;

$$\hat{SE}_{(i)} = \sqrt{\frac{\sum_{j=1}^{n}[AdjMR_{j(i)} - \hat{MR}_{(i)}]^2}{n^2}} \quad \text{is an}$$

estimate of the SE for the $i^{th}$ BSS $\hat{MR}$ is the original sample mean

The number of BSS's (B) must be large enough to assure that the bootstrap $\hat{Z}$ distribution has reached its true form and shape, and involves the number of simulation runs needed to get a process to a steady state. If the process is static with respect to time then a Monte Carlo type of simulation is utilized. If the process is dynamic with respect to time and evolves over time then a continuous or discrete event simulation is utilized, as reported in Law, A. M. and Kelton, W. D., "Simulation Modeling and Analysis (Third edition)", McGraw Hill, Boston (2000), hereby incorporated by reference.

A preferred embodiment of the present invention uses a computational algorithm that relies on repeated random sampling to compute the results, such as Monte Carlo methods or BSS's at a point in time and our steady state is the $\hat{Z}$ distribution reaching its true shape.

Determination of when the true shape is reached is based on some relative error rule of the distributional parameters. Our rule is to pick the minimum number of runs such that the total relative error (TRE)<10%. The total relative error (TRE) is based on the mean and variance of $\hat{Z}$. It can be shown that by measuring the relative error for various sizes of B that approximately 1000 BSS's are usually enough runs to satisfy the 10% TRE criterion.

FIG. 3 is a partial flow chart with box 4 comprising computation of the 90% confidence interval. Using these estimates ($\hat{SE}$, $\hat{MR}$, and $\hat{Z}$) along with NBTA to compute an approximate 2-sided 100(1−2α)% confidence interval (α is the desired area in each tail) for the ratio mean metric (this is CIM4RM). The $\alpha^{th}$ percentile is first computed along with the $(1-\alpha)^{th}$ percentile of the $\hat{Z}$ distribution, which are referred to as $\hat{t}_\alpha$ and $\hat{t}_{1-\alpha}$, respectively, as shown in box 4A of FIG. 3. It follows that the 100(1−2α)% CI is:

Lower CI bound=$\hat{MR}-\hat{SE}*\hat{t}_\alpha$ and

Upper CI bound=$\hat{MR}-\hat{SE}*\hat{t}_{1-\alpha}$ (5)

The $\hat{Z}$ distribution accounts for the correlation of man-hours & miles and the variation in miles because the process utilizes bootstrapping.

For example, performance parameters for many systems can be tracked and evaluated using ratio mean metrics, such as Maintenance Ratio (MR). A Maintenance Ratio (MR) estimate is based on a sample of n vehicles from a finite population, where man-hours and miles are associated with each vehicle. Weapons systems refers to the type of vehicle (e.g. tank, recovery vehicle, etc.). The methodology is useful in making informed life cycle management decisions regarding combat systems.

A confidence interval (CI) for MR using the methodology of a preferred embodiment in a specific environment will provide better information when making a decision on maintenance augmentation before a mission. Some other useful applications of ratio means include: Mean failures divided by mean miles; Mean number of explosive devices detected divided by mean number of total explosive devices; etc. Many other sample ratio means exist for other problems related to military, civil government, and private organizations.

The maintenance ratio (MR) data from 2055 wheeled vehicles served as the finite population to validate the methodology of the preferred embodiment by evaluating coverage and other properties. A sample of 92 tracked vehicles (MR data) were used to demonstrate the methodology. Data for both wheeled and tracked systems were collected from vehicles between December 2003 and June 2008.

In accordance with a preferred embodiment of the present invention, an existing tool (bootstrap-t approach (proposed by Efron, B. and Tibshirani, R. J., "An Introduction to the Bootstrap", London U.K.: Chapman & Hall/CRC (1998), hereby incorporated by reference) with no parametric assumptions on the distributions) and is utilized in conjunction with other methodology of the present invention to compute approximate confidence intervals for a ratio mean metric. The bootstrap-t utilizes the estimation of three parameters based on a sample: (1) Mean, (2) Standard Error (SE), and (3) Bootstrap standardized Z distribution.

The following is an estimate of the arithmetic mean of the population $\hat{MR}$ based on the sample of n AdjMR's:

$$\hat{MR} = \frac{\sum_{j=1}^{n} Man-hours_j/n}{\sum_{j=1}^{n} Miles_j/n}$$

The estimate of the SE of using this same sample of n AdjMR's is the following:

$$\hat{SE} = \sqrt{\frac{\sum_{j=1}^{n}(AdjMR_j - \hat{MR})^2}{n^2}}$$

In this example, a Bootstrap Sample (BSS) of n vehicles comprises random sampling of one vehicle at a time with replacement from the original set of n vehicles. The probability of selecting a given vehicle for each of the n random selections is 1/n.

For example, suppose n=4 vehicles were randomly selected (without replacement) from a population of N vehicles. As shown in box 1 of FIG. 2, bootstrap samples are generated from n original vehicles. Some possible BSS's of MR values are:

| | |
|---|---|
| .0056, .0022, .0039 and .0054 | ORIGINAL SAMPLE OF 4 |
| .0022, .0039, .0022, .0056 | ONE POSSIBLE BSS |
| .0056, .0039, .0056, .0056 | ANOTHER POSSIBLE BSS |

In this example there are $4^4$=256 possible unique bootstrap samples (BSS's).

A preferred embodiment comprises bootstrapping, among other formulations to generate an approximate confidence interval (CI) around a ratio mean. This is done by generating a large number of BSS's through a Monte Carlo simulation procedure.

B Bootstrap Samples (BSS) are generated from the n original vehicles in box 1 of FIG. 2. Next, (as represented in boxes 3 and 3C of FIG. 2) a standardized bootstrap Z distribution is developed from the sample of n vehicles. The B must be large enough to assure the Z distribution reaches its true form. As referenced in box 1A, each of the n elements of the boot strap sample i (i=1 to B) contain all vehicle information; i.e. man-hours and miles for that vehicle.

For each BSS, the mean and standard error estimate is computed as represented in box 2 of FIG. 2. The computation of the standardized Z value for each $i^{th}$ of the BSS is given by:

$$\hat{Z}_{(i)} = \frac{\hat{MR}_{(i)} - \hat{MR}}{\hat{SE}_{(i)}} \text{ where } \hat{MR}_{(i)}$$

is an estimate of the mean for the $i^{th}$ BSS;

$$\hat{SE}_{(i)} = \sqrt{\frac{\sum_{j=1}^{n}[AdjMR_{j(i)} - \hat{MR}_{(i)}]^2}{n^2}} \text{ is an}$$

estimate of the SE for the $i^{th}$ BSS $\hat{MR}$ is the original sample mean

Next, as represented in FIG. 3, $\hat{MR}, \hat{SE}, \hat{Z}$ estimates are used to compute an approximate 2-sided 100(1−2α)%, confidence interval (CI), where α is the desired area in each tail.

Next the standardized values are ordered and compute the αth and (1−α)th percentiles are computed using the following:

$\hat{t}_\alpha = \alpha^{th}$ percentile from the $\hat{Z}$ distribution $\hat{t}_{1-\alpha} = (1-\alpha)^{th}$ percentile from the $\hat{Z}$ distribution The 100(1−2α)% CI is:

Lower CI bound=M̂R−ŜE*$\hat{t}_{1-\alpha}$

Upper CI bound=M̂R−ŜE*$\hat{t}_{\alpha}$

For example, during the time period of April 1998 through August 2006, in conjunction with the tracking of 92 vehicles recording a total mileage of 81,941 miles and a total of 7,738.9 man-hours, the MR was 0.094.

The computation of a 90% confidence interval CI (2 sided) using a preferred embodiment of the present invention, α=0.05 implies a 90% confidence interval (CI); where 100 (1−2α) equals 90%.

Using the values from box 4A of FIG. 3:

0.0944−($\hat{t}^{(1-\alpha)}$)ŜE 0.0944−($\hat{t}^{\alpha}$)ŜE

Where 0.0944 is an estimate of the population MR and where SE=0.008581 is standard error of sampling distribution. $t^{0.95}$=1.356 $t^{0.05}$=−1.53 are the nonparametric t values used to explain non-symmetrical patterns (based on bootstrapping).

Based upon the above values, a 90% confidence interval is calculated as [0.0827, 0.1075].

FIG. 4 is a graphical illustration showing the confidence levels on the x-axis versus the maintenance ratio on the y-axis.

Factors which effect the foregoing evaluations include: sample size, location, correlation, distribution characteristics (variation, shape and skewness) of the two paired variables and outliers. For example, assuming all factors are constant except sample size, as the sample size increases the confidence interval CI width will decrease (or become more efficient). The variability of the sampling distribution for MR increases as more data variability increases. Therefore, all other factors constant, it can be shown that more variability implies an increase in CI. As correlation increases and all other factors are constant, it can be shown that the CI becomes smaller The $\hat{Z}$ distribution accounts for the correlation of man-hours and miles and the variation in man-hours and miles. The following mathematical argument creates the framework to the next level of validation:

Using ŜE to serve as the estimate for SE for M̂R, knowing that this an imprecise method because M̂R does not fully account for variation in miles. The argument and hypothesis are that the product ŜE*$\hat{t}_{(\alpha\ or\ 1-\alpha)}$ is not compromised because the lack of variation of miles in ŜE is accounted for in the $\hat{Z}$ distribution and ultimately $t_{(\alpha\ or\ 1-\alpha)}$. This hypothesis is tested and validated by simulating the confidence interval properties (coverage, non-coverage and efficiency) for many ratio mean problems, for which validation results were found.

The validity of the present invention methodology was measured by coverage and other confidence interval properties. In order to gauge performance, repeated samples from a population were taken and coverage, noncoverage, efficiency and other properties were evaluated. Coverage was defined to be the percentage of the confidence intervals (CIs) that contains the true population mean, where each CI was constructed with some method or "process" at a given confidence level for a given paired random sample from a finite population (size N) or infinite population. For 2-sided CI's, non-coverage probabilities are the percentage of times the CI misses the true mean to the left or right. Ideally, each side has a probability equal to half of the significance level. Efficiency is the average length of all the CI's that were used to create coverage.

Using N=2055 Wheeled vehicles to define our finite population, the Finite Population MR=0.0031, the total man-hours=29,380, the total miles=9,405,678, Spearman's Rho Correlation=0.25, a determination of the optimal number of S's (S is the optimal number of samples [without replacement] from the finite population) becomes a sample size problem, where the measurement variable is a desired coverage (i.e. lets say 90%) and each trial is a binomial outcome.

Using a precision of 1% around a 90% desired coverage with 90% confidence level yields S=1221.

Using a defined B=number of bootstrapped samples (BSS) to create one confidence interval (CI) and S=number of samples of size n to determine coverage, the results of this coverage model (2 sided 90% confidence interval (CI)) with finite population is shown in the following table.

TABLE 2

| Sample Size | Coverage | Non-coverage Left | Non-coverage Right | Efficiency | CVE |
|---|---|---|---|---|---|
| 15 | 87.55% | 7.01% | 5.44% | 0.0051 | 1.645 |
| 60 | 90.80% | 5.25% | 4.25% | 0.0021 | 0.677 |
| 100 | 90.50% | 4.87% | 4.33% | 0.0015 | 0.484 |

The value for S (# of repeated samples from population)=1221, B (# of bootstrap samples used for CIM4RM)=1000.

These same results were computed for populations with different MR's, distribution shapes and correlation of paired data. The results were generally good, except for correlated data near 1 and outliers.

Lognormal distributions with very small CV's (less than 0.2) were the best fitting distributions based on MLE using the 1221 CI lengths for each sample size case.

The coverage for preferred embodiment was very close to the required 90% at the low, medium and high samples sizes. Also note the non-coverage left and right probabilities are close to required 5% for the preferred embodiment, except not as balanced when sample size is very small (n=15). Notice how this balance improves as sample size increases. Also, different confidence levels were tested with good results.

It is noted that the Coefficient of Variation for Efficiency (CVE)=efficiency/MR; MR=0.0031; is used for comparison purposes if the population MR are different. This measure of variation based on the efficiency to MR ratio is very similar to CV which measures the variation based on the standard deviation to the mean.

Coverage and its related properties for the preferred embodiment were tested with many ratio mean problems and were shown to perform very well for various measures of sample size, correlation, location and distribution mix, demonstrating the methodology as a reliable and stable tool for building CI's around ratio means.

The only scenarios where coverage starts to deviate away from the required level is for extremely high correlation with highly skewed data, existence of outliers in the data that cause the location parameter to shift or cases where the sample sizes are extremely small. When the two variables for the ratio mean are highly correlated, the confidence interval tends to be extremely short.

FIG. 5 depicts a high level block diagram of a general purpose computer suitable for use in performing the functions described herein, including the steps shown in the flowcharts of FIGS. 2 and 3 As depicted in FIG. 5, the system 200 includes a processor element 202 (e.g., a CPU) for controlling the overall function of the system 200. Processor 202 operates in accordance with stored computer program code, which is stored in memory 204. Memory 204 represents any type of computer readable medium and may include, for example, RAM, ROM, optical disk, magnetic disk, or a combination of these media. The processor 202 executes the computer program code in memory 204 in order to control the functioning of the system 200. Processor 202 is also connected to network interface 205, which transmits and receives network data packets. Also included are various input/output devices 206 (e.g., storage devices, including but not limited to, a tape drive, a floppy drive, a heard disk drive or compact disk drive, a receiver, a transmitter, a speaker, a display, a speech synthesizer, an output port, and a user input device (such as a keyboard, a keypad, a mouse and the like)).

It has been demonstrated that the preferred embodiment methodology is a reliable and stable tool for building confidence intervals (CIs) around ratio means. Currently, the methodology is being used to quantitatively analyze maintenance ratios and other ratio mean performance metrics for fielded systems. The Office of Inspector General for the Department of Health and Human Services has used this methodology for reporting ratio mean confidence intervals to the U.S. Congress. Some other existing applications include: performance evaluations for military test systems, evaluations of a detection demonstration, hypothesis testing development for comparing two ratio means, aging effects hypothesis testing, and paired reliability hypothesis testing.

The present invention may be utilized in conjunction with observations of failures, cost overruns and schedule overruns are routinely better predicted by the simulations than by human intuition or alternative "soft" methods.

The terminology "confidence interval" as used herein is an interval estimate of a population parameter, which, instead of relying on a single value, uses an interval likely to include the parameter, which may be used to indicate the reliability of an estimate. The likelihood that the interval will contain the parameter is determined by the confidence level or confidence coefficient. Increases in desired confidence level widens the confidence interval. The confidence interval may be qualified by a particular confidence level that is expressed as a percentage, such as 90% confidence interval, with the end points generally referred to as the limits, the higher the confidence level, the wider the confidence interval will be.

As used herein the terminology "standardized $\hat{Z}$ distribution" or "$\hat{Z}$ distribution" terminology is used herein as defined on page 160 in Efron, B. and Tibshirani, R. J., "An Introduction to the Bootstrap", London U.K.: Chapman & Hall/CRC (1998), hereby incorporated by reference, and implies the variance transformation distribution using multivariate or ratio data.

As used herein the terminology "population" means the total number of units under surveillance, study, inspection or control, wherein the units can be vehicles, people, animals, or any subject.

As used herein the terminology "sample" or "samples" means a representative unit from the total group which may be selected randomly or by using a selection process.

As used herein, the terminology "confidence interval" means an estimate of a population parameter where instead of estimating the parameter by a single value, an interval likely to include the parameter is determined. The likelihood the interval contains the parameter is determined by the confidence level or confidence coefficient.

As used in the following claims, the terminology "computer" means processor, microprocessor, controller, microcontroller, multiprocessor, CPU, or computer network.

As used in the following claims, the terminology "sample" means a number of unts which is a random sample of the population. For ratio mean problems, the sample is paired values X(i) and Y(i) where i is the $i^{th}$ unit.

As used in the following claims, the terminology "processor" means computer, microprocessor, controller, microcontroller, multiprocessor, CPU, or computer network.

As used in the following claims, the terminology "redefined" means each element of the ratio sample, i.e. each paired term, is redefined using the equation $$adjRM_k = n*X_k \Big/ \sum_{j=1}^{n} Y_j$$

where k is the kth unit of a sample of n paired units where the pair is Xj, Yj and j is an index that represents the sample size.

Although various preferred embodiments of the present invention have been described herein in detail to provide for complete and clear disclosure, it will be appreciated by those skilled in the art that variations may be made thereto without departing from the spirit of the invention.

It should be emphasized that the above-described embodiments are merely possible examples of implementations. Many variations and modifications may be made to the above-described embodiments. All such modifications and variations are intended to be included herein within the scope of the disclosure and protected by the following claims.

The invention claimed is:

1. A method for sampling a population of units of multivariate data where the distribution of X and Y variables are unknown by evaluating ratio mean measurements on a computer to determine a confidence interval comprising:
obtaining a sample from a population having two variables X and Y;
using a bootstrapping method, generating from the sample a number B of boot strap samples (BSS), where B is a number greater than 100; generating a standardized $\hat{Z}$ distribution for the ratio mean MR from the B bootstrap samples using the equation $$\hat{Z}_{(i)} = \frac{\hat{MR}_{(i)} - \hat{MR}}{\hat{SE}_{(i)}} \text{ where } \hat{MR}_{(i)} = \sum_{j=1}^{n} X_{j(i)}$$

is an estimate of the ratio mean for the $i^{th}$ boot strap sample, $$\sum_{j=1}^{n} Y_{j(i)}$$

$X_{j(i)}, Y_{i(i)}$ are the n paired units for the $i^{th}$ boot strap sample where j(i) corresponds to the $j^{th}$ unit for the $i^{th}$ bootstrap sample, where i can range from 1 to B; $\hat{SE}_{(i)}$ is the standard error for the $i^{th}$ boot strapped sample and wherein standard error $\hat{SE}_{(i)}$ is determined by the equation $$\hat{SE}_{(i)} = \sqrt{\frac{\sum_{j=1}^{n} [AdjMR_{j(i)} - \hat{MR}_{(i)}]^2}{n^2}}$$

where $$adjMR_{j(i)} = n * X_{j(i)} \bigg/ \sum_{k=1}^{n} Y_{k(i)}$$

for the $j^{th}$ unit for the $i^{th}$ bootstrap sample where k is indexed from 1 to n, and j is in the range of 1 to n where n is the size of the sample;

computing on a computer the $\alpha^{th}$ and the $(1-\alpha)^{th}$ percentile of the $\hat{Z}$ distribution;

computing on a computer the lower and upper bounds of the confidence interval CI using the equations Lower CI bound=$\hat{MR}-\hat{SE}*\hat{t}_{1-\alpha}$ Upper CI bound=$\hat{MR}-\hat{SE}*\hat{t}_{\alpha}$ where $$\hat{MR} = \frac{\sum_{j=1}^{n} X_j}{\sum_{j=1}^{n} Y_j}$$

is the estimated ratio mean for the original sample; where $\hat{SE}$ is the standard error for the original sample computed by $$\hat{SE} = \sqrt{\frac{\sum_{j=1}^{n}[AdjMR_j - \hat{MR}]^2}{n^2}},$$

where $$adjMR_j = n * X_j \bigg/ \sum_{k=1}^{n} Y_k$$

and $\hat{t}_\alpha$ and $\hat{t}_{1-\alpha}$ correspond to $1/\alpha$ and $1/(1-\alpha)$ respectively, whereby the bounds of the confidence interval CI are used to make a determination as to whether or not the number of samples taken from the population is statistically adequate to evaluate the entire population.

2. The method of claim 1 further comprising the step of validating the confidence interval by evaluating the confidence interval properties using a Monte Carlo simulation based on the population.

3. The method of claim 1 wherein the method for sampling is used to determine the number of samples of vehicles necessary to determine the maintenance requirements for a population comprising vehicles and wherein the two variable properties XY are manhours and miles for the population of vehicles.

4. The method of claim 1 wherein the step of computing on a computer the $\alpha$th and the $(1-\alpha)$th percentile comprises selecting $\alpha=0.05$ and the step of computing the desired confidence interval comprises using the equation $100(1-2\alpha)$ which equals 90% when $\alpha=0.05$ for a confidence interval CI of 90%.

5. The method of claim 1 wherein the number of samples n is in the range of 10 to 200.

6. A system for determining whether the number of samples taken from a population of units is substantially indicative of the total population with respect to two variables X and Y by evaluating ratio mean measurements on a computer to determine a confidence interval comprising:

a processor having an input for inputting samples from the population, the processor generating a number B of boot strap samples (BSS), where B is a number greater than 100 and generating a standardized $\hat{Z}$ distribution for the ratio mean MR from the B bootstrap samples using the equation $$\hat{Z}_{(i)} = \frac{\hat{MR}_{(i)} - \hat{MR}}{\hat{SE}_{(i)}}$$

where $$\hat{MR}_{(i)} = \frac{\sum_{j=1}^{n} X_{j(i)}}{\sum_{j=1}^{n} Y_{j(i)}}$$

is an estimate of the ratio mean for the $i^{th}$ boot strap sample, $X_{j(i)}, Y_{j(i)}$ are the n paired units for the $i^{th}$ boot strap sample where j(i) corresponds to the $j^{th}$ unit for the $i^{th}$ bootstrap sample, where i can range from 1 to B; $\hat{SE}_{(i)}$ is the standard error for the $i^{th}$ boot strapped sample and wherein standard error is determined by the equation $$\hat{SE}_{(i)} = \sqrt{\frac{\sum_{j=1}^{n}[AdjMR_{j(i)} - \hat{MR}_{(i)}]^2}{n^2}}$$

and $\hat{MR}_{(i)}$ is the ratio mean of the $i^{th}$ bootstrap $$adjMR_{j(i)} = n * X_{j(i)} \bigg/ \sum_{k=1}^{n} Y_{k(i)}$$

for the $j^{th}$ unit for the $i^{th}$ bootstrap sample where k is indexed from 1 to n, and j is in the range of 1 to n where n is the size of the sample;

means for computing the $\alpha^{th}$ and the $(1-\alpha)^{th}$ percentiles of the $\hat{Z}$ distribution; and means for computing the lower and upper bounds of the confidence interval CI using the equations Lower CI bound=$\hat{MR}-\hat{SE}*\hat{t}_{1-\alpha}$ Upper CI bound=$\hat{MR}-\hat{SE}*\hat{t}_{\alpha}$ where $$\hat{MR} = \frac{\sum_{j=1}^{n} X_j}{\sum_{j=1}^{n} Y_j}$$

is the estimated ratio mean for the original sample; $\hat{SE}$ is the standard error for the original sample computed by $$\hat{SE} = \sqrt{\frac{\sum_{j=1}^{n}[AdjMR_j - \hat{MR}]^2}{n^2}}$$

where $$adjMR_j = m * X_j \bigg/ \sum_{k=1}^{n} Y_k,$$

and $\hat{t}_\alpha$ and $\hat{t}_{1-\alpha}$ corresponds to $1/\alpha$ and $1/(1-\alpha)$ respectively.

7. The system of claim 6 wherein the processor operates to validate the confidence interval by evaluating the confidence interval properties of coverage and nonconverage using a Monte Carlo simulation based on the population.

8. The system of claim 6 wherein the system is used for sampling to determine the number of samples of vehicles necessary to determine the maintenance requirements for a population comprising vehicles and wherein the two variables X and Y are manhours and miles for the population of vehicles.

9. The system of claim 6 wherein $\alpha = 0.05$ and the processor computes the desired confidence interval using the equation $100(1-2\alpha)$ which equals 90% when $\alpha = 0.05$ for a confidence interval CI of 90%.

10. The system of claim 6 wherein the sample size n is in the range of 10 to 200 and B is the number of bootstrap samples, each bootstrap sample having a sample size n comprising n paired variables X and Y, and wherein the processor operates to redefine the multivariate data that comprises the two variables X and Y using the equation $$AdjMR_k = n * X_k \bigg/ \sum_{j=1}^{n} Y_j$$

where k is the kth unit of a sample of n variables X, where the pair is Xj, Yj and j is an index that represents one Bootstrap sample.

11. A method for sampling a population of units of multivariate data where the distribution of X and Y variables are unknown by evaluating ratio mean measurements on a computer to determine a confidence interval comprising:
inputting samples into a computer from the total population with each unit sample having at least two variables X and Y;
estimating the ratio means;
computing the standard error;
using a bootstrapping method, generating boot strap samples from 1 to B, computing a Z distribution based upon the bootstrap samples using the equation $$\hat{Z}_{(i)} = \frac{\hat{MR}_{(i)} - \hat{MR}}{\hat{SE}_{(i)}}$$

where $$\hat{MR} = \frac{\sum_{j=1}^{n} X_j}{\sum_{j=1}^{n} Y_j}$$

is the estimated ratio mean for the original sample and $$\hat{MR}_{(i)} = \frac{\sum_{j=1}^{n} X_{j(i)}}{\sum_{j=1}^{n} Y_{j(i)}}$$

is an estimate of the ratio mean for the $i^{th}$ boot strap sample, $X_{j(i)}, Y_{j(i)}$ are the n paired units for the $i^{th}$ boot strap sample where j(i) corresponds to the $j^{th}$ unit for the $i^{th}$ bootstrap sample, where i can range from 1 to B; $\hat{SE}_{(i)}$ is the standard error for the $i^{th}$ boot strapped sample and wherein standard error $\hat{SE}_{(i)}$ is determined by the equation $$\hat{SE}_{(i)} = \sqrt{\frac{\sum_{j=1}^{n}[AdjMR_{j(i)} - \hat{MR}_{(i)}]^2}{n^2}}$$

where $$adjMR_{j(i)} = n * X_{j(i)} \bigg/ \sum_{k=1}^{n} Y_{k(j)}$$

for the $j^{th}$ unit for the $i^{th}$ bootstrap sample where k is indexed from 1 to n, and j is in the range of 1 to n where n is the size of the sample; and computing the confidence interval.

12. The method of claim 11 further comprising computing on a computer the $\alpha^{th}$ and the $(1-\alpha)^{th}$ percentiles of the Z distribution and wherein the step of computing the confidence interval comprises using the equations Lower CI bound = $\hat{MR} - \hat{SE} * \hat{t}_{1-\alpha}$ Upper CI bound = $\hat{MR} - \hat{SE} * \hat{t}_\alpha$ where $$\hat{MR} = \frac{\sum_{j=1}^{n} X_j}{\sum_{j=1}^{n} Y_j}$$

is the estimated ratio mean for the original sample; where $\hat{SE}$ is the standard error for the original sample computed by $$\hat{SE} = \sqrt{\frac{\sum_{j=1}^{n} [AdjMR_j - \hat{MR}]^2}{n^2}},$$

where $$adjMR_j = n * X_j \Big/ \sum_{k=1}^{n} Y_k$$

and $\hat{t}_\alpha$ and $\hat{t}_{1-\alpha}$ correspond to $1/\alpha$ and $1/(1-\alpha)$ respectively.

13. The method of claim 11 wherein the step of computing the confidence level comprises computing the $\alpha^{th}$ and the $(1-\alpha)^{th}$ percentile of the $\hat{Z}$ distribution.

14. The method of claim 11 wherein the step of computing the confidence level comprises determining whether the total relative error is less than a predetermined percentage based upon distributional parameters.

15. The method of claim 11 wherein the number of samples n is in the range of 10 to 200.

\* \* \* \* \*